US00RE50955E

(19) United States
(12) Reissued Patent
Shi

(10) Patent Number: US RE50,955 E
(45) Date of Reissued Patent: Jul. 21, 2026

(54) MOBILE PHONE SHELL

(71) Applicant: Shenzhen Zhongda HuiGou Technology Co., LTD., Shenzhen (CN)

(72) Inventor: Xudong Shi, Shenzhen (CN)

(21) Appl. No.: 29/995,048

(22) Filed: Mar. 25, 2025

Related U.S. Patent Documents

Reissue of:
(64) Patent No.: Des. 1,025,044
Issued: Apr. 30, 2024
Appl. No.: 29/898,962
Filed: Aug. 3, 2023

(51) LOC (15) Cl. ..... 14-03
(52) U.S. Cl.
USPC ..... D14/250
(58) Field of Classification Search
USPC ..... D14/203.3, 203.4, 203.5, 203.6, 203.7, D14/447, 217, 240, 238.1, 440, 251, 252, D14/253, 250, 248, 439, 496; D13/103, D13/107, 108, 119; D3/201, 218, 247, D3/249, 269, 273, 301, 303, 294, 299, D3/300, 302
CPC ..... A45C 1/06; A45C 11/00; H04B 1/3888; H04B 1/0202; H04B 1/0283
See application file for complete search history.

(56) References Cited

U.S. PATENT DOCUMENTS 5,926,049 A * 7/1999 Shi ..... H03K 19/018585 326/82
D688,654 S * 8/2013 Stevinson ..... D14/250
D720,739 S * 1/2015 Liu ..... D14/250
8,933,729 B1 * 1/2015 Shi ..... H03F 3/45179 326/82
9,128,825 B1 * 9/2015 Albrecht ..... G06F 12/0253
9,172,566 B1 * 10/2015 Li ..... H04L 25/03885
9,231,731 B1 * 1/2016 Nguyen ..... H04L 1/0036
9,565,279 B2 * 2/2017 Daniell ..... H04M 1/0283
(Continued)

OTHER PUBLICATIONS

Shenzhen Zhongda Huigou Technology Co., LTD., "Vihibii for iPhone 14 Pro Max Case, Wallet Case with Card Holder (Storage 4 Cards), Slide Camera Cover & Kickstand [Military Grade Drop Protection] Phone Case 6.7" (2022), Black", Oct. 14, 2022, <URL: https://www.amazon.com/dp/B0BJ6QQLWS> [ Retrieved on Mar. 20, 2025].

*Primary Examiner* — Darlington Ly

(57) CLAIM

The ornamental design for a mobile phone shell, as shown and described.

DESCRIPTION

*This application is a reissue application of U.S. design Pat. No. D1,025,044, which was filed as U.S. design application Ser. No. 29/898,962 on Mar. 8, 2023 and granted as U.S. design Pat. No. D1,025,044 on Apr. 30, 2024, the contents of which are hereby incorporated by reference herein in their entirety.*

FIG. 1 is a front view of a mobile phone shell showing my new design;
FIG. 2 is a back view thereof;
FIG. 3 is a left side view thereof;
FIG. 4 is a right side view thereof;
FIG. 5 is a top view thereof;
FIG. 6 is a bottom view thereof;
FIG. 7 is a front, left-side, and top perspective view thereof; and,
FIG. 8 is a back, right-side, and bottom perspective view thereof.

The broken lines shown in the drawings depict portions of the mobile phone shell that form no part of the claimed design.

1 Claim, 8 Drawing Sheets

Matter enclosed in heavy brackets [ ] appears in the original patent but forms no part of this reissue; matter printed in italics indicates the additions made by reissue.

(Amended)

(56) References Cited

U.S. PATENT DOCUMENTS

D808,374 S * 1/2018 Lee ..... D14/250
10,082,823 B1 * 9/2018 Chang ..... G11C 5/04
D830,352 S * 10/2018 Chung ..... D14/250
D843,364 S * 3/2019 Sasaki ..... D14/250
D863,284 S * 10/2019 Luo ..... D14/250
D863,286 S 10/2019 Hong
10,678,196 B1 * 6/2020 Al-Turki ..... G05B 13/041
D897,347 S * 9/2020 Luo ..... D14/440
D933,643 S * 10/2021 Liao ..... D14/250
D934,220 S * 10/2021 Chen ..... D3/249
D937,250 S * 11/2021 Jakobuco ..... D14/250
D941,282 S * 1/2022 Bai ..... D14/250
D947,828 S * 4/2022 Bai ..... D14/250
D961,575 S * 8/2022 Liu ..... D14/250
D962,919 S * 9/2022 Luo ..... D14/250
D967,812 S 10/2022 Li
D974,345 S * 1/2023 Zeng ..... D14/250
D976,249 S * 1/2023 Liu ..... D14/250
D976,889 S * 1/2023 Zhang ..... D14/250
D978,124 S 2/2023 Wang
D991,921 S * 7/2023 Wang ..... D14/250
D995,505 S * 8/2023 Luo ..... D14/250
D1,018,516 S * 3/2024 Shi ..... D14/250
D1,025,044 S * 4/2024 Shi ..... D14/250
D1,087,944 S * 8/2025 Shi ..... D14/250
D1,087,945 S * 8/2025 Shi ..... D14/250
2005/0068073 A1 * 3/2005 Shi ..... H03L 7/107 327/156
2005/0258875 A1 * 11/2005 Wang ..... H03K 19/018528 327/108
2007/0252735 A1 * 11/2007 Shi ..... G01R 31/31727 341/118
2013/0271897 A1 * 10/2013 Limber ..... G06F 1/1656 361/679.01
2014/0370946 A1 * 12/2014 Daniell ..... H04M 1/0283 455/575.8
2015/0141082 A1 * 5/2015 Ehrlich ..... H04B 1/3888 455/575.1
2018/0042844 A1 * 2/2018 Kent ..... A61K 31/436
2018/0239391 A1 * 8/2018 Chang ..... G11C 7/222
2018/0275714 A1 * 9/2018 Chang ..... G06F 13/1689
2019/0024440 A1 * 1/2019 Shi ..... E06B 3/4636
2019/0187744 A1 * 6/2019 Chang ..... G11C 7/1039
2020/0076652 A1 * 3/2020 Shi ..... G06F 13/1689
2020/0234199 A1 * 7/2020 Xiong ..... G06N 20/20
2020/0308891 A1 * 10/2020 Shi ..... B60J 10/40
2020/0378169 A1 * 12/2020 Shi ..... F16H 1/16
2021/0136150 A1 * 5/2021 Zhang ..... G06N 5/01
2022/0151354 A1 * 5/2022 Soderstrom ..... H04M 1/185
2022/0244139 A1 * 8/2022 Feng ..... G01M 13/04
2022/0244152 A1 * 8/2022 Feng ..... G01N 3/10
2022/0244153 A1 * 8/2022 Feng ..... G01N 3/10
2022/0390340 A1 * 12/2022 Feng ..... G01N 3/10
2024/0301782 A1 * 9/2024 Feng ..... E21F 15/00
2024/0360761 A1 * 10/2024 Bai ..... E21F 15/005
2024/0360762 A1 * 10/2024 Feng ..... E21F 17/16

* cited by examiner

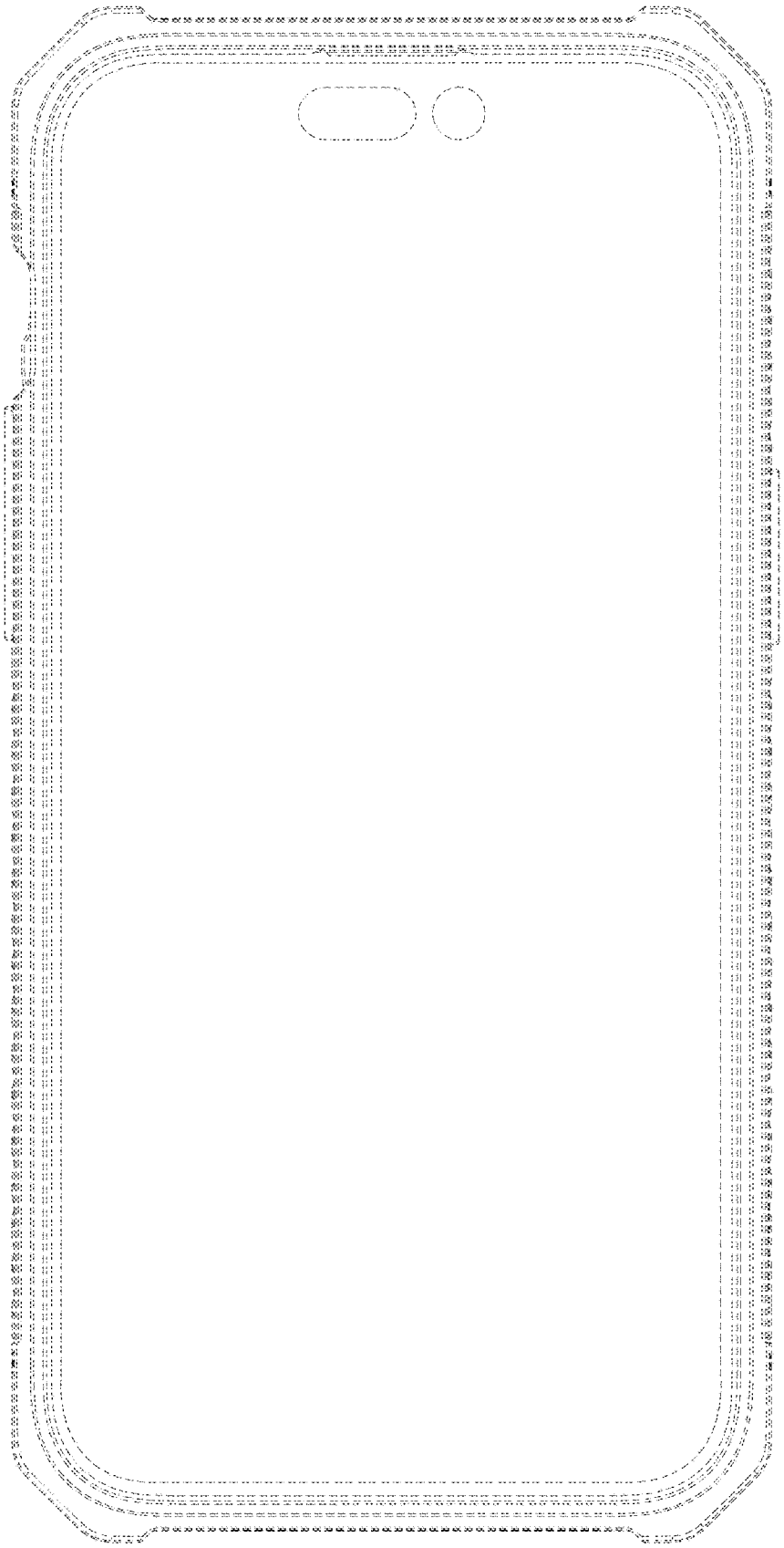
FIG. 1(Amended)

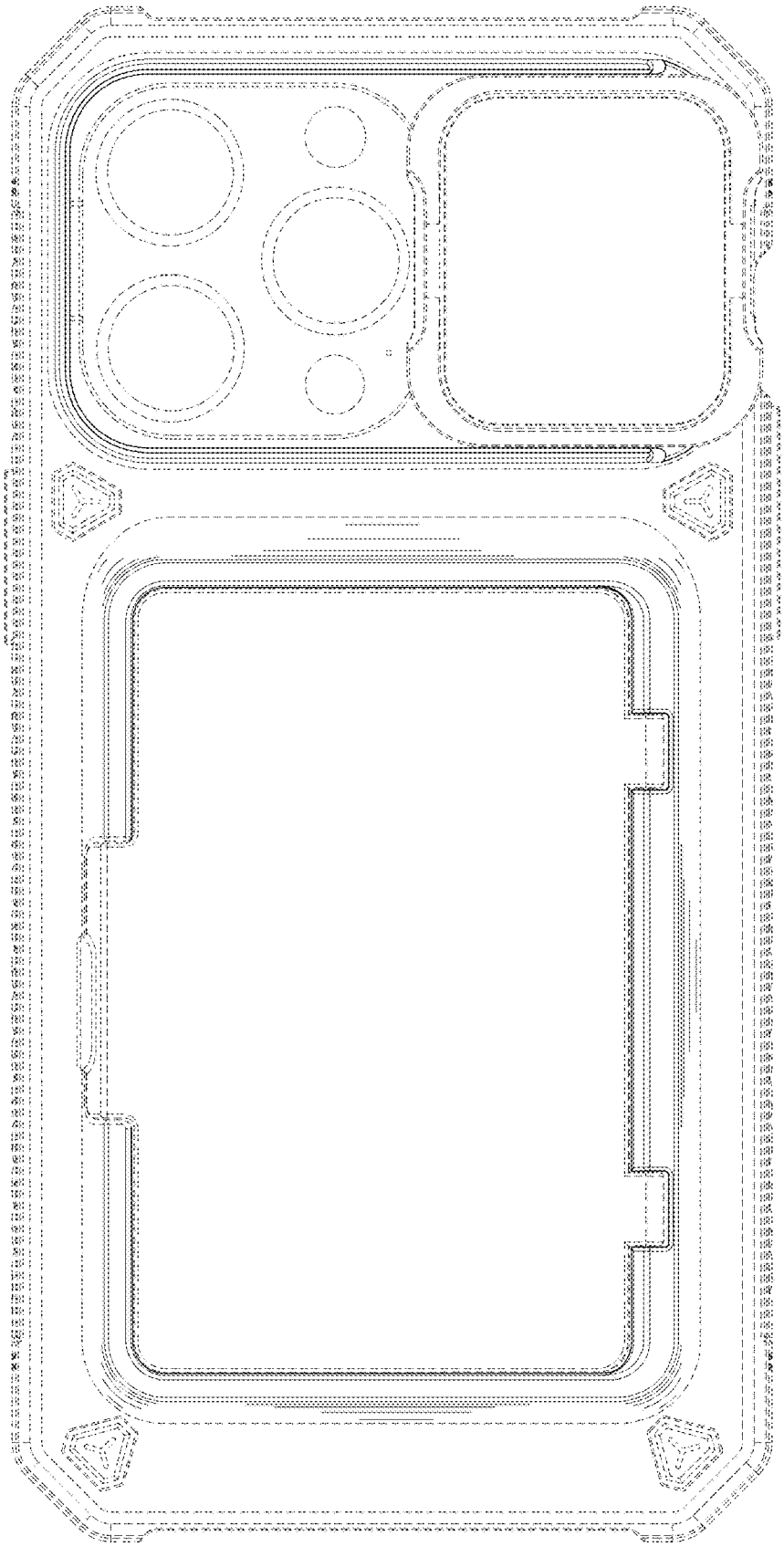
FIG. 2 (Amended)

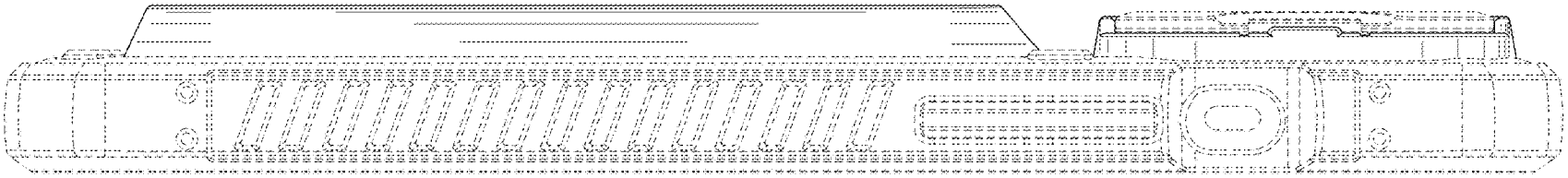
FIG. 3 (Amended)

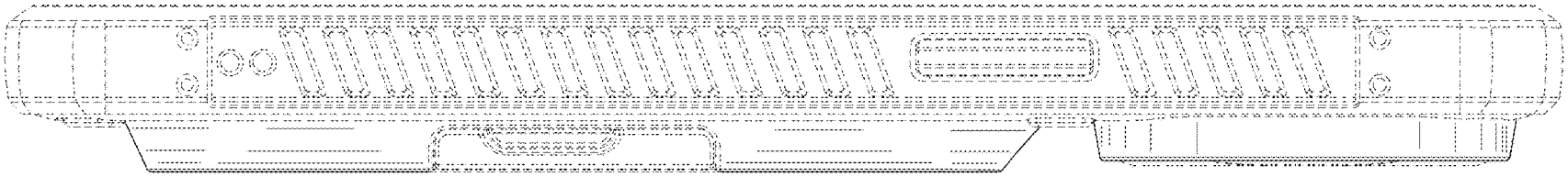
FIG. 4 (Amended)

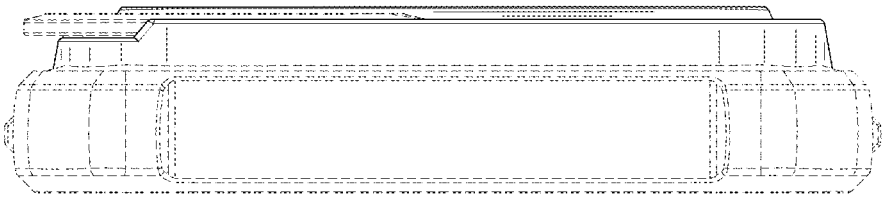
FIG. 5 (Amended)

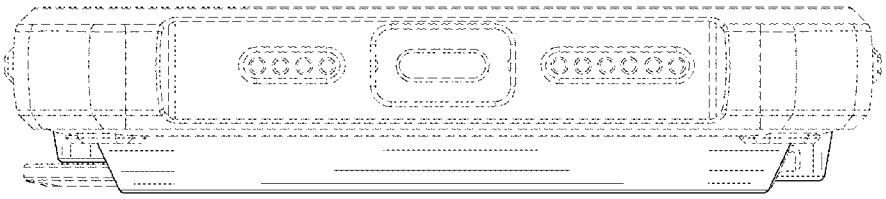
FIG. 6 (Amended)

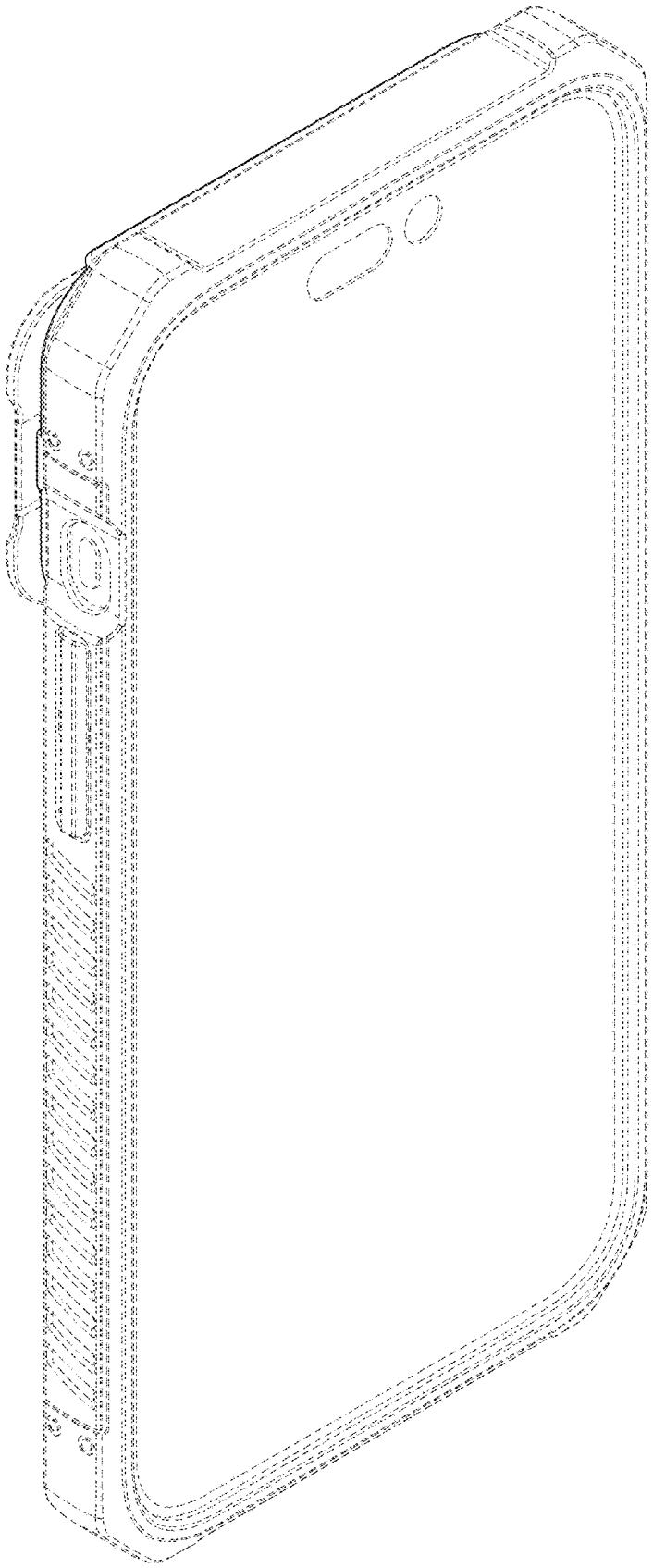
FIG. 7 (Amended)

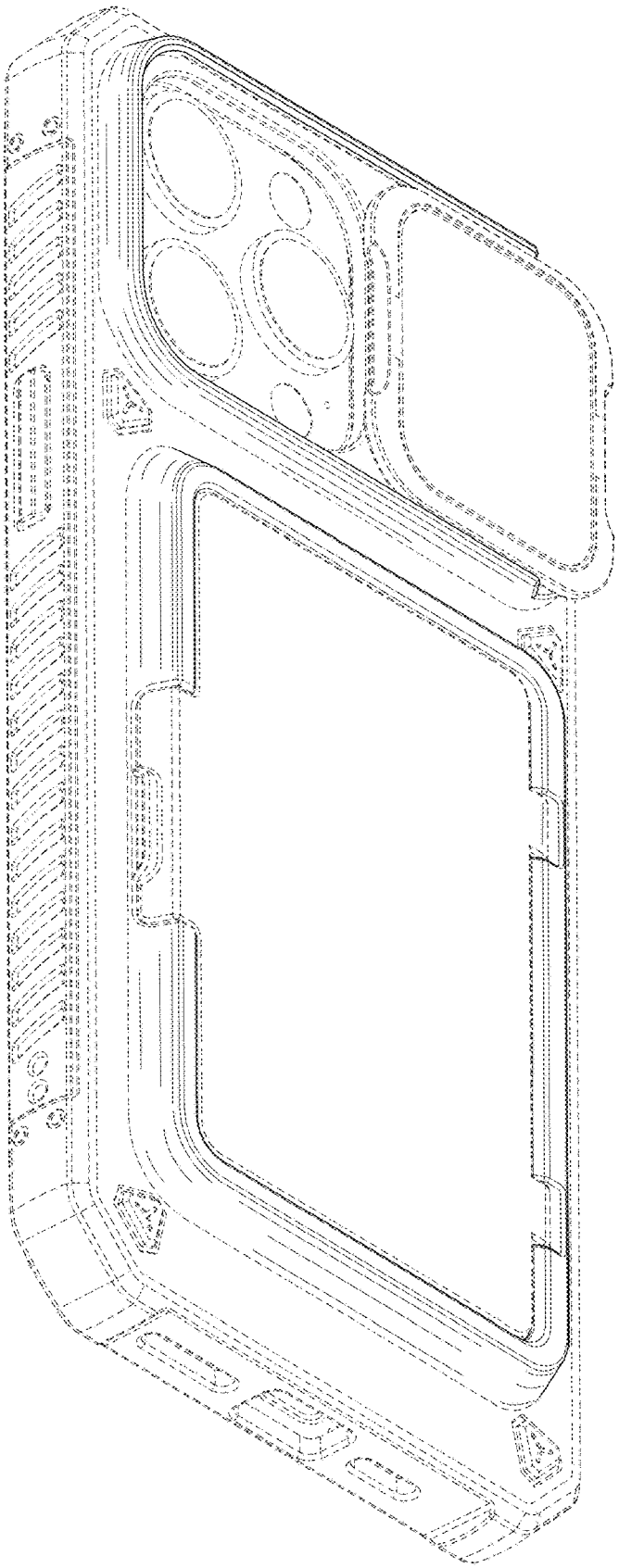
FIG. 8 (Amended)